Patented Feb. 17, 1948

2,436,058

UNITED STATES PATENT OFFICE 2,436,058

PRODUCTION OF ALKYL CYCLOALKYL HALIDES

Louis Schmerling, Riverside, Ill., assignor to Universal Oil Products Company, Chicago, Ill., a corporation of Delaware No Drawing. Application February 15, 1943, Serial No. 475,962

14 Claims. (Cl. 260—648)

This invention relates to the reaction of cyclo-olefins with alkyl halides to produce alkyl cycloalkyl halides. More specifically, the process is concerned with a method of interacting or condensing alkyl halides with cyclo-olefins in the presence of a catalyst to form halogenated cyclic compounds convertible into alkyl cyclo-olefins, alkyl cycloparaffins, alkyl cycloalkyl carbinols, and other alkyl cycloalkyl compounds.

By the term "condensing" used in the following specification and claims, I mean the chemical combining of an alkyl halide with a cyclo-olefin to produce an alkyl cycloalkyl halide with a molecular weight equal to the sum of the molecular weights of said alkyl halide and said cyclo-olefin. In some cases, the alkyl cycloalkyl halide so formed from an alkyl halide and a cyclo-olefin may react with a second molecular proportion of the cyclo-olefin to yield a higher boiling compound with a molecular weight equal to the sum of the molecular weights of the alkyl halide and twice the molecular weight of said cyclo-olefin. Also, the term "alkyl halide" as used herein means a monohaloalkane.

In one specific embodiment the present invention comprises a process for producing an alkyl cycloalkyl halide by condensing an alkyl halide and a cyclo-olefin in the presence of a catalyst comprising as its essential catalytic ingredient a Friedel-Crafts type metal halide.

Cyclo-olefinic hydrocarbons utilizable in the present process comprise cyclic hydrocarbons of the general formula $C_nH_{2n-2}$ in which $n$ represents an integer which is at least 3 and preferably 5 or 6. Cyclopentene, alkyl cyclopentene, cyclohexene, and alkyl cyclohexenes are the cyclo-olefins which I prefer to react with alkyl halides to produce alkyl cyclopentyl- and alkyl cyclohexyl-halides including monoalkyl and polyalkyl cycloalkyl halides. Thus, a cyclo-olefin and an alkyl halide condense to form an alkyl cycloalkyl halide while a monoalkyl cyclo-olefin and an alkyl halide react to form a dialkyl cycloalkyl halide. Cyclopropene, cyclobutene, and alkyl cyclobutenes are generally more difficult to obtain than the cyclo-olefins containing rings of 5 or 6 carbon atoms and, accordingly, are used less frequently in the present process.

Certain types of terpenic hydrocarbons, particularly those with one double bond per molecule, may be condensed with alkyl halides to form higher molecular weight compounds which may be considered as alkyl cycloalkyl halides.

The cyclo-olefins which are utilizable in the present process may be obtained from any source. Cyclopentene and cyclohexene hydrocarbons are frequently present in the products formed by catalytic cracking of naphthenic oils. Such naphthenic oils contain cyclopentane and cyclohexane hydrocarbons which undergo dehydrogenation and isomerization reactions during cracking, and particularly during catalytic cracking, to form the corresponding cyclo-olefins and alkyl cyclo-olefins with 5 and 6 carbon atoms per ring. Various cyclo-olefins may also be produced by synthetic means, for example cyclohexene is obtainable by hydrogenation of phenol to cyclohexanol and dehydration of the latter to cyclohexene. The different cyclo-olefins which may be reacted with alkyl halides in the presence of the catalysts herein disclosed are not necessarily equivalent in their actions and, accordingly, in any case, the conditions of operation are dependent upon the cyclo-olefins and alkyl halides undergoing treatment.

Some alkyl halides are produced by direct addition of a hydrogen halide to a mono-olefinic hydrocarbon, said addition reaction being effected generally in the presence of a catalyst such as a Friedel-Crafts type metal halide, an acid such as sulfuric, or phosphoric acids, etc. Such an addition of a hydrogen halide to an olefin results in the production of a secondary alkyl halide from a non-tertiary olefin containing 2 or more carbon atoms per molecule and in the formation of a tertiary alkyl halide from a tertiary olefin such as isobutylene, trimethyl ethylene, etc. Primary alkyl halides also utilizable in the present process for producing alkyl cycloalkyl halides are obtainable by other means such as the addition of a hydrogen halide to ethylene, the treatment of a primary alcohol with a hydrogen halide in the presence of a suitable catalyst such as zinc chloride, etc. Primary alkyl bromides may be obtained from a 1-alkene or alpha olefin by addition of hydrogen bromide in the presence of peroxides or sunlight. Aralkyl halides, as for example, benzyl chloride or bromide, which may also be employed in the process of this invention, may be prepared by halogenating alkyl aromatic hydrocarbons and by other means.

Alkyl chlorides and bromides are generally preferred for use in effecting condensation reactions with cyclo-olefinic hydrocarbons but alkyl iodides and fluorides may also be utilized, although not necessarily under the same conditions of operation, particularly when different cyclo-olefinic hydrocarbons are also involved in the production of various alkyl- and polyalkyl-cycloalkyl halides.

Suitable catalysts for the process of the present invention comprise metal halides of the Friedel-Crafts type and particularly anhydrous ferric chloride, bismuth chloride, and zirconium chloride. More reactive metal halides such as aluminum chloride, aluminum bromide, etc., as well as zinc chloride, are also suitable for this purpose. The conditions of operation utilizable with the different Friedel-Crafts metal halides or metal halide mixtures may be different depending upon the catalyst activity and other factors. These different catalytic materials which may be employed may be utilized as such; they may be dissolved in a suitable solvent such as nitromethane, nitrobenzene, carbon disulfide, etc.; or they may be composited with one another or disposed on solid carriers or supporting materials to produce catalyst composites of desired activities. Suitable catalyst carriers or supports include both adsorptive and substantially non-adsorptive materials, for example, alumina, activated charcoal, crushed porcelain, raw and acid-treated clays, diatomaceous earth, pumice, firebrick, etc. The carriers should be substantially inert in the sense that substantially no interaction which is detrimental to the activity or selectivity of the catalyst composite occurs between the carrier and metal halide.

The present process for reacting or condensing an alkyl halide with a cyclo-olefin apparently involves the addition of the alkyl halide to the double bond of the unsaturated hydrocarbon to produce another halogenated hydrocarbon of higher molecular weight. Thus, for example, the condensation of tertiary butyl chloride with cyclopentene produces a substantial yield of tertiary butyl cyclopentyl chloride which may also be referred to as a chloro tertiary butyl cyclopentane in which the chlorine atom and tertiary butyl group are probably attached to adjacent carbon atoms of the cyclopentane ring. Such a condensation reaction is illustrated by the following equation:

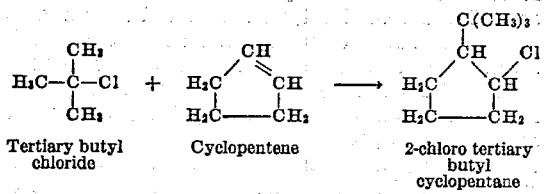

Tertiary butyl chloride    Cyclopentene    2-chloro tertiary butyl cyclopentane

Tertiary butyl chloride and other alkyl halides undergo similar condensations with cyclohexene and other cyclo-olefins producing, respectively, alkyl cyclohexyl chloride and other alkyl cycloalkyl halides. Under some conditions, the combination of an alkyl halide with a cyclo-olefin may be so controlled as to yield higher boiling alkyl cycloalkyl halides other than those resulting from the union of one molecular proportion each of the original cyclo-olefin and alkyl halide charged to the process.

The production of alkyl cycloalkyl halides is carried out by reacting an alkyl halide with a cyclo-olefin in the presence of a Friedel-Crafts type catalyst at a condensation temperature and generally at a pressure sufficient to insure substantially liquid phase operation. Thus, in the presence of a bismuth chloride catalyst the condensation of tertiary butyl chloride and cyclohexene may be carried out at a temperature of from about 0° to about 50° C. but room temperature is generally employed. On the other hand, when ferric chloride or aluminum chloride is chosen as catalyst, temperatures of about −40° to about +40° C. may be used, but temperatures below 0° C. are preferred. Condensation reactions of the type herein set forth may be carried out at atmospheric pressure or under a superatmospheric pressure. Other Friedel-Crafts type metal halides also require rather specifically defined temperatures for catalyzing the production of alkyl cycloalkyl halides.

It appears that tertiary alkyl halides are more reactive with cyclo-olefinic hydrocarbons than are secondary alkyl halides, and that in turn the secondary alkyl halides are more reactive than primary alkyl halides. Also primary, secondary, and tertiary alkyl halides are not necessarily utilizable under the same conditions of operation to produce high yields of alkyl cycloalkyl halides.

The condensation of an alkyl halide with a cyclo-olefin in the presence of a Friedel-Crafts type catalyst may be carried out using either batch or continuous operation. A hydrogen halide, such as hydrogen chloride or hydrogen bromide, may also be introduced with the cyclo-olefin and alkyl halide charged to the process. The introduction of hydrogen may also have a beneficial effect on the reaction.

In batch type operation desired proportions of an alkyl halide and a cyclo-olefin or of an alkyl halide and a hydrocarbon fraction containing at least one cyclo-olefin are introduced to a reactor containing the Friedel-Crafts type catalyst, as such or composited with a carrier, and the resultant commingled materials are contacted until a substantial proportion of the reactants are converted into the desired alkyl cycloalkyl halide. The reaction mixture, after separation from the catalyst, is fractionated to separate any unconverted cyclo-olefinic hydrocarbon fraction and unconverted alkyl halide from the higher boiling alkyl cycloalkyl halide produced. The recovered materials may be used in another run.

Continuous operations may be carried out by directing a mixture of a cyclo-olefinic hydrocarbon and an alkyl halide through a reactor of suitable design containing a stationary bed of granular Friedel-Crafts type catalyst. In this kind of treatment, the operating conditions may be adjusted suitably and may differ somewhat from those employed in batch type operations. Thus, when a mixture of an alkyl halide and a cyclo-olefin is passed through a tube containing, for example, ferric chloride supported by granular porcelain, the formation of the desired alkyl cycloalkyl halide may be effected by using a higher temperature and shorter time of treatment than required for effecting similar conversion by contacting a similar reaction mixture and catalyst at a lower temperature in a batch type reactor, such as an autoclave provided with suitable stirring means.

In some cases, it is advisable to commingle the charged alkyl halide and cyclo-olefinic hydrocarbon with a substantially inert solvent such as a paraffinic hydrocarbon, for example, normal pentane; or a nitroparaffin, for example, nitromethane; and then to effect the condensation in the presence of this added solvent. Obviously, the solvent chosen should be one which does not itself undergo undesirable reactions under the operating conditions utilized.

Different alkyl cycloalkyl halides produced by the present process may be used for various purposes. They may be converted into hydrocarbons of high antiknock value, or they may be utilized as solvents, or employed as intermediates in organic syntheses. Thus, isobutylene may be reacted with hydrogen chloride to form tertiary butyl chloride which is then condensed, for example, with cyclopentene to form tertiary butyl cyclopentyl chloride which may be dehydrochlorinated to give tertiary butyl cyclopentene, the latter hydrocarbon being hydrogenatable to tertiary butyl cyclopentane. The tertiary butyl cyclopentyl chloride may also be converted into tertiary butyl cyclopentanol in relatively high yield. These methods of producing tertiary butyl cyclopentyl compounds are preferred to the procedure utilized heretofore which included the reaction of a tertiary butyl magnesium halide with cyclopentanone or with the cyclization of tertiary butyl adipic acid.

The following examples are given to illustrate the character of results obtained by the use of specific embodiments of the present process, although the data presented are not introduced with the intention of unduly restricting the generally broad scope of the invention.

Example I 18.5 parts by weight of tertiary butyl chloride and 13.5 parts by weight of cyclopentene were placed in a cylindrical glass reactor and cooled therein under atmospheric pressure to −78° C. by immersing the reactor and contents in a cooling mixture of solid carbon dioxide and acetone. To the cooled mixture of tertiary butyl chloride and cyclopentene were added 2 parts by weight of ferric chloride. The reactor was then placed in a bath of ice-water for about five minutes and thereafter the reaction mixture was washed with water and dried. Distillation of 24 cc. of the dried product gave fractions with the properties shown in the following table.

| Fraction No. | Boiling Point | | Boiling Point @ 760 mm. | Volume, cc. | Refractive Index, $n_D^{20}$ |
|---|---|---|---|---|---|
| | °C. | @ mm. pressure | | | |
| 1 | 46–48 | 740 | 46–48 | 9.2 | |
| 2 | 52–71 | 26 | 148–169 | 1.0 | |
| 3 | 71–87 | 26 | 169–186 | 1.3 | |
| 4 | 87–89 | 28 | 186–187 | 1.9 | 1.4662 |
| 5 | 89–89 | 29 | 187–187 | 5.0 | 1.4670 |
| 6 | 89–92 | 29 | 187–190 | 2.2 | 1.4678 |
| Residue | | | | 2 | |

The product collected in fraction No. 1 consisted of unconverted tertiary butyl chloride and cyclopentene, while the product obtained boiling at 186–187° C. under a pressure of 760 mm. consisted of a mixture of liquid and crystals, the latter having a camphor-like odor and a melting point of 78° C. Analysis of the crystals showed them to contain 65.8% of carbon and 10.5% of hydrogen while the calculated values of tertiary butyl cyclopentyl chloride are 67.2% carbon and 10.7% hydrogen. The refractive index values shown above for fraction Nos. 4, 5, and 6 were taken on the liquid product remaining after the crystalline material was separated therefrom. Thus, a substantial proportion of the product formed by reacting cyclopentene with tertiary butyl chloride consisted of at least two isomeric tertiary butyl cyclopentyl chlorides.

Example II

To a mixture of 46 grams of tertiary butyl chloride (0.5 mole) and 26 grams of cyclohexene (0.3 mole) at 20° C. was added 3.5 grams of bismuth chloride. The catalyst turned pink in color and then became orange colored within 5 minutes but a test portion of the reaction mixture showed that very little material had been formed boiling above 80° C. Accordingly, 2 grams more of bismuth chloride were added whereupon a turbid orange colored upper layer and a brown paste-like lower layer resulted. The mixture was set aside for two weeks, then the liquid layer was separated from the catalyst and the liquid was washed and dried. Distillation of 44 cc. of the dried liquid product gave fractions with the properties shown in the following table.

| Fraction No. | Boiling Point | | Boiling Point @ 760 mm. | Volume, cc. | Refractive Index, $n_D^{20}$ | Approximate Density at 20° C. |
|---|---|---|---|---|---|---|
| | °C. | @ mm. pressure | | | | |
| 1 | 46–47 | 23 | 141–142 | 3.6 | 1.4592 | |
| 2 | 47–49 | 23 | 142–145 | 10.6 | 1.4593 | 0.90 |
| 3 | 49–69 | 23 | 145–168 | 5.5 | 1.4539 | |
| 4 | 45–71 | 7 | 162–199 | 6.3 | 1.4476 | |
| 5 | 71–72 | 7 | 199–200 | 6.5 | 1.4722 | 0.88 |
| 6 | 72–75 | 6.5 | 200–206 | 2.9 | 1.4722 | |
| 7 | 75–80 | 6.5 | 206–212 | 1.0 | 1.4706 | |
| Residue | | | | 2.5 | | |

Fraction No. 1 and Fraction No. 2 were cyclohexyl chloride which apparently formed from cyclohexene by the addition of hydrogen chloride formed by dehydrochlorination of tertiary butyl chloride. The material contained in fraction Nos. 5 and 6 consisted of tertiary butyl cyclohexyl chloride. The major proportion of this material was present in fraction 5 which melted at between −50 and −40° C.

The character of the invention and the type of results obtained by its use are evident from the preceding specification and examples, although they are not to be construed as imposing undue limitations upon its generally broad scope.

I claim as my invention:

1. A process for producing an alkyl cycloalkyl halide which comprises condensing tertiary butyl chloride and a cyclo-olefin in the presence of bismuth chloride at a temperature of from about 0° C. to about 50° C.

2. A process for producing an alkyl cycloalkyl halide which comprises condensing tertiary butyl chloride and a cyclo-olefin in the presence of ferric chloride at a temperature of from about −40° C. to about +40° C.

3. A process for producing an alkyl cycloalkyl halide which comprises condensing tertiary butyl chloride and a cyclo-olefin in the presence of aluminum chloride at a temperature of from about −40° C. to about +40° C.

4. A process for producing an alkyl cycloalkyl chloride which comprises condensing a tertiary alkyl chloride and a cyclo-olefin in the presence of a catalyst comprising as its essential catalytic ingredient a Friedel-Crafts type metal halide at a temperature of from about −40° C. to about +50° C.

5. A process for producing an alkyl cycloalkyl bromide which comprises condensing a tertiary alkyl bromide and a cyclo-olefin in the presence of a catalyst comprising as its essential catalytic ingredient a Friedel-Crafts type metal halide at a temperature of from about −40° C. to about +50° C.

6. A process for producing a tertiary butyl cyclopentyl chloride which comprises condensing tertiary butyl chloride and cyclopentene in the presence of ferric chloride at a temperature of from about −40° to about +40° C.

7. A process for producing an alkyl cycloalkyl chloride which comprises condensing tertiary butyl chloride and a cyclo-olefin in the presence of a metal halide catalyst of the Friedel-Crafts type at a temperature of from about −40° C. to about +50° C.

8. A process for producing an alkyl cycloalkyl chloride which comprises condensing tertiary butyl chloride and cyclohexene in the presence of a metal halide catalyst of the Friedel-Crafts type at a temperature of from about −40° C. to about +50° C.

9. A process for producing an alkyl cycloalkyl chloride which comprises condensing tertiary butyl chloride and cyclopentene in the presence of a metal halide catalyst of the Friedel-Crafts type at a temperature of from about −40° C. to about +50° C.

10. A process for producing an alkyl cycloalkyl halide which comprises condensing a tertiary alkyl halide and a cyclo-olefin in the presence of a Friedel-Crafts metal halide catalyst at a temperature of from about −40° C. to about +50° C., the halogen of said alkyl halide being selected from the group consisting of chlorine and bromine.

11. The process as defined in claim 10 further characterized in that said catalyst comprises aluminum chloride.

12. The process as defined in claim 10 further characterized in that said catalyst comprises ferric chloride.

13. The process as defined in claim 10 further characterized in that said catalyst comprises bismuth chloride.

14. A process for producing an alkyl cycloalkyl halide which comprises reacting a tertiary alkyl halide with a cyclo-olefin in the presence of a Friedel-Crafts metal halide catalyst, the halogen of said alkyl halide being selected from the group consisting of chlorine and bromine.

LOUIS SCHMERLING.

REFERENCES CITED

The following references are of record in the file of this patent:

"Chemical Abstracts, vol. 29, col. 7279 (1935), Abstract of article by Nenitzescu et al. in "Annalen der Chemie," vol. 519, pages 260–71 (1935).

Ibid., vol 31, col. 2175 (1937). Abstract of article by Nenitzescu et al. in "Ber. der Deut. Chem. Gesell." vol. 69B, pages 2706–7 (1936).

Simons et al., "Jour. Am. Chem. Soc.," vol. 60, pages 2956–7 (1938).

Simons et al., "Industrial & Engineering Chemistry," vol. 32, pages 178–180 (1940).

Simons et al., "Journal of American Chemical Society," vol. 65, pages 1269–71 (July 1943).

Thomas, "Anhydrous Aluminum Chloride in Organic Chemistry," pages 734–44 (1941). (Copy in Division 31.)